United States Patent [19]

Garro

[11] Patent Number: 5,560,146

[45] Date of Patent: Oct. 1, 1996

[54] AUTOMATIC TRAP FOR CATCHING COCKROACHES

[76] Inventor: Daniel F. Garro, Aguiar St. 145, San Nicolas, Argentina, (2900) ARG.

[21] Appl. No.: 247,339

[22] Filed: May 23, 1994

[51] Int. Cl.$^6$ .................................................. A01M 23/10
[52] U.S. Cl. .................................. 43/74; 43/111; 43/121
[58] Field of Search .............................. 43/121, 111, 61, 43/73, 72, 74

[56] References Cited

U.S. PATENT DOCUMENTS

| 141,346 | 7/1873 | Hannah | 43/121 |
|---|---|---|---|
| 2,100,909 | 11/1937 | Mora | 43/121 |
| 4,266,363 | 5/1981 | Chen | 43/73 |
| 4,429,483 | 2/1984 | Murakami | 43/74 |
| 4,641,456 | 2/1987 | Boharski | 43/73 |
| 5,148,625 | 9/1992 | Saleman | 43/121 |
| 5,305,545 | 4/1994 | Cerullo | 43/72 |

FOREIGN PATENT DOCUMENTS

| 0672709 | 12/1989 | Switzerland | 43/73 |
|---|---|---|---|
| 8503201 | 8/1985 | WIPO | 43/73 |

Primary Examiner—Joseph J. Hail, III
Assistant Examiner—James Miner
Attorney, Agent, or Firm—Dvorak and Traub

[57] ABSTRACT

An automatic trap for catching cockroach independently of the size, volume or weight thereof, comprising a box with cockroach collecting cavity having an upper surface with a trap opening, at least two separate coplanar plates being provided to close said trap opening in a close position. Each plate has an electrical conducting portion connected to a control circuit which, in turn, is connected to a driving mechanism capable of being actuated to move the plates away from each other into an open position for uncovering the trap opening and providing access to the cockroach collecting cavity. When a cockroach simultaneously touches the electrical conducting portions of the plates, the portions are put into electrical contact because of the conductivity provided by the cockroach body, so that the driving mechanism is excited by the control circuit to move the plates to their open position.

15 Claims, 2 Drawing Sheets

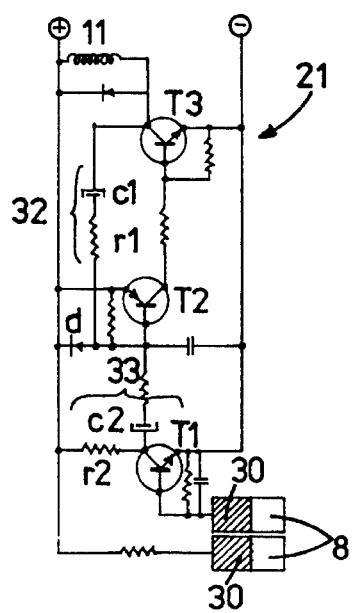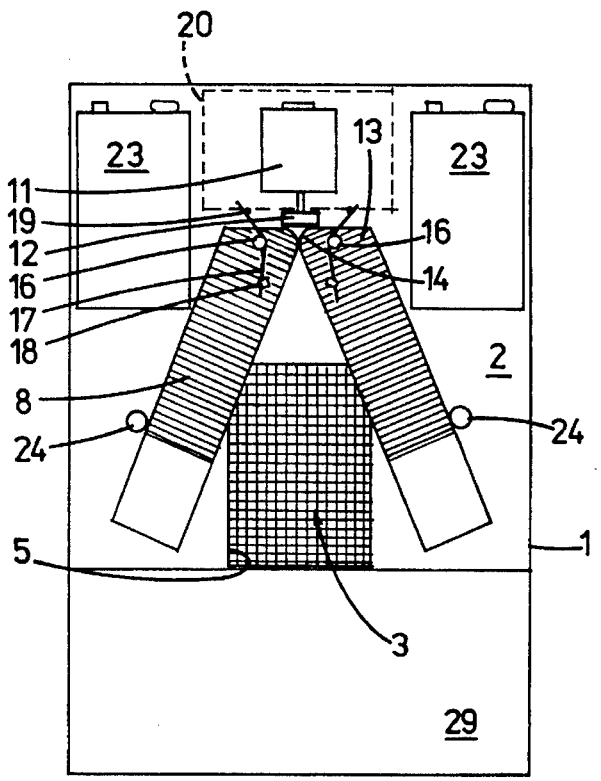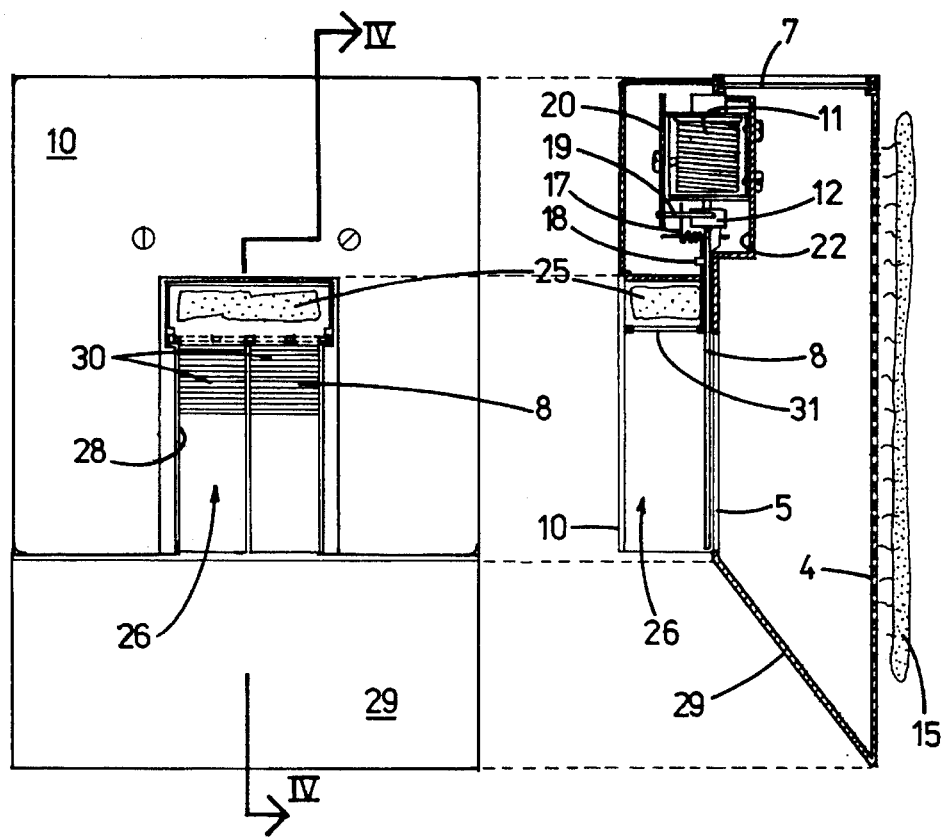
FIG. 5
FIG. 2
FIG. 3
FIG. 4

AUTOMATIC TRAP FOR CATCHING COCKROACHES

BACKGROUND OF THE INVENTION

1. Field of the Invention

The present invention relates to means for the extermination of undesirable insects and particularly refers to an automatic trap for catching cockroach.

2. Description of the Prior Art

It is well know that there are a lot of pesticides and insecticides that fail in extermining the insect species for which they have been developed. This is because the insects, and particularly cockroach, are becoming more resistant to these compounds and no lethal effects are caused by many products now in the market. As a consecuence of this, new and more powerful insecticides are developed and higher risks of damages for humans are being increased.

Other systems consist of cardboards with a bait and adhesives so as to attract the insect and leading it to a surface wherein the insect is caused to get stuck in the adhesive. Frequently the cockroach gets rid of the stuck and runs away.

3. Summary of the Invention

In virtue of the above problems the inventor has studied the different cockroach species as well as their behavior, allways taking into account that no insecticides should be used to preserve the human life. When studying several possibilities, the inventor discarded a mechanical device the operation of which could depend upon parameters such as the size, volume or weight of the cockroach because of the enormous differences between the species. For example, a new device should catch with the same efficiency species like the *Periplaneta orientalis* with a size of 35 mm. and the breeds or babies of the *Blatella germanica* the size of which is 2 mm.

It is therefore an object of the invention to provide an automatic trap for catching cockroach wherein the insect is catched independently of it size, volume or weight and the insect has access, free of obstacles, to a zone adjacent to a bait wherein the cockroach is detected by a sensor capable of activating an electromechanical mechanism. To facilitate handling thereof, the device has no wires and is electrically fed by conventional batteries.

It is further an object of the invention to provide a trap for cockroach wherein the insect is detected because of the water contained in the body thereof, like in all living organisms, animal or vegetal species. The invention takes advantage of the electrical conductivity of the water to close a circuit through the insect's body and a current passing through the body of the cockroach is amplified by an amplifier to operate an electromechanical system. The amplifier is sensitive to a current passing through a resistor of 20 megaohms.

The above and other advantages is achieved by the device of the invention which consists of an automatic trap for catching cockroach, comprising a box defining a cockroach collecting cavity and an upper surface with a trap opening, at least two separate coplanar plates being provided to close said trap opening in a close position, each plate having an electrical conducting portion connected to a control circuit which, in turn, is connected to a driving mechanism capable of being actuated to move the plates away from each other into an open position for uncovering the trap opening and providing access to the cockroach collecting cavity, whereby when a cockroach simultaneously touches the electrical conducting portions of the plates, said portions are put into electrical contact to each other because of the conductivity provided by the cockroach body, so that the driving mechanism is excited by the control circuit to move the plates to their open position.

The box includes a cap removably fixed onto the upper surface of the box for covering the plates and the driving mechanism, and defining an access with a roof for guiding the cockroach to a bait located under the cap, for attracting the cockroach.

The above and other objects, features and advantages of this invention will be better understood when taken in connection with the accompanying drawings and description of a preferred embodiment.

BRIEF DESCRIPTION OF THE DRAWINGS

The present invention is illustrated by way of example in the following drawings wherein:

FIG. 2 is a plant view of the trap with the plates in the open position;

FIG. 3 is a plant view of the trap including the cap, with the roof of the access removed;

FIG. 4 is a cross sectional elevation view of the trap taken along line IV—IV of FIG. 3;

FIG. 5 shows the control circuit.

DESCRIPTION OF THE PREFERRED EMBODIMENTS

Figure 1:
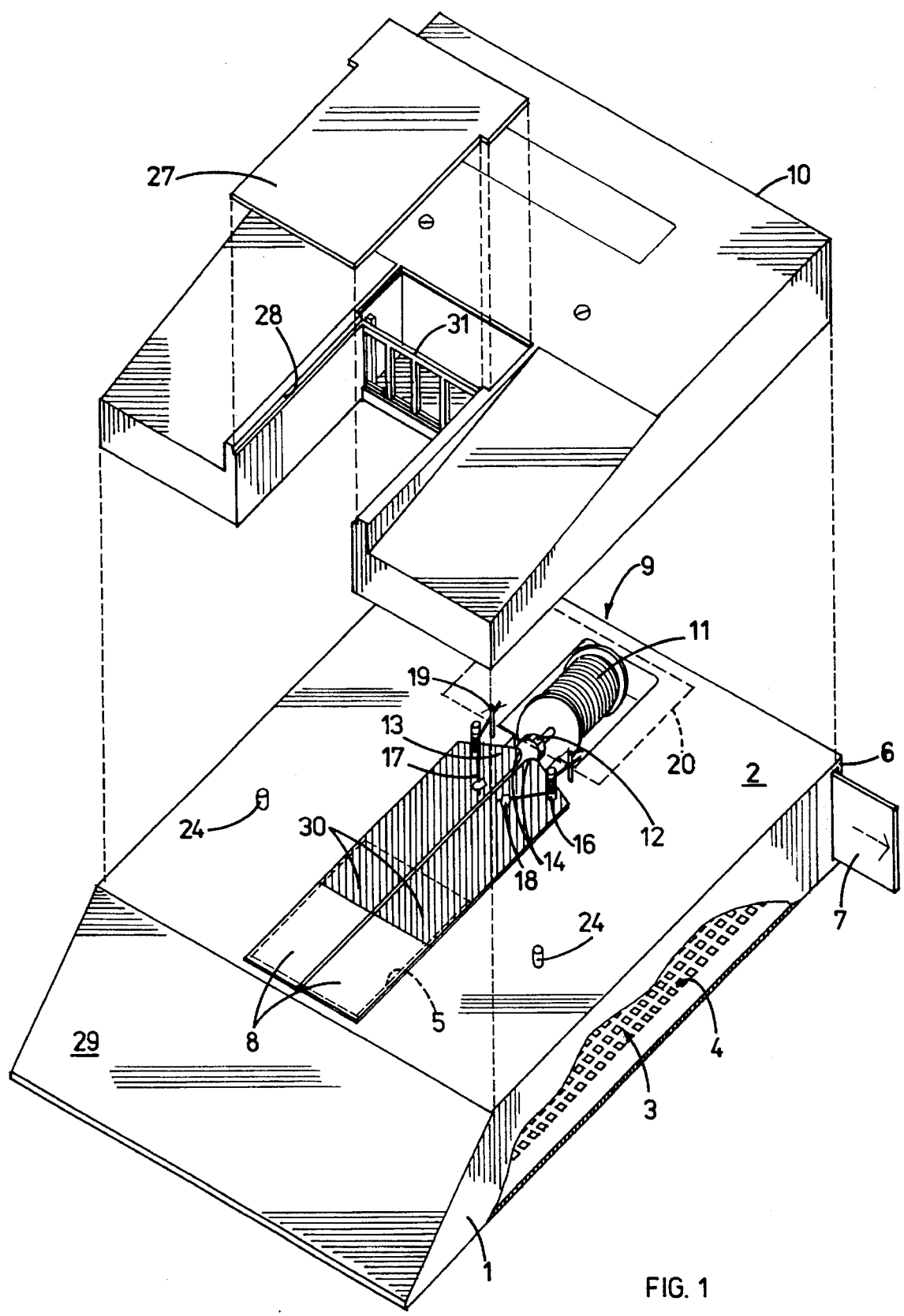
FIG. 1 is a partially sectional and exploded perspective view of the trap of the invention, with the plates shown in the close position.

Referring now in detail to the drawings.

FIG. 1 shows the trap of the invention in a perspective view, the trap comprising a box 1 made of any suitable material, having an upper surface 2 and defining a cockroach collecting cavity 3, the box having a foraminous floor 4 with the purpose of allowing the entering of a gas from an external source such as a piece of fabric 15 with alcohol, which alcohol produces brain damages in the cockroach and the later death thereof. A rear part of the box has a cockroach removing opening 6 closed by a slidable guided door 7 which may be transparent and made of plastics.

Box 1 includes a trap opening 5 formed in upper surface 2 and covered by a pair of coplanar plates 8. Plates 8 remain normally parallel, in a close position, wherein the plates cover the trap opening 5 and have respective sloped rear ends 13, that is each edge is cut on bias, so as to define respective projected tips 14. Plates 8 are pivotally mounted, at the rear ends 13 thereof, on pins 16, and have, at respective rear parts thereof, cockroach sensor means which in the preferred embodiment consists of electrical conducting portions 30 which may comprise metal linings. As an alternative, an infrared sensor may be provided.

A driving mechanism 9 is provided and fixed onto box 1, particularly in a recess 22 to actuate on plates 8. Driving mechanism 9 comprises an electromagnet or solenoid coil 11 having a magnetic core-stem 12 capable of moving axially so as to abut tips 14 of plates 8 and extend to push against tips 14 and cause plates 8 to rotate on pins 16 and move away from each other into a fan-like open position shown in FIG. 2. Plates 8 are normally closed by the force of springs 17 having an end retained in ears 18 of plates 8 and another end resting against pending pins 19 provided in a circuit board 20. Board 20 is mounted over solenoid 11 and contains a control circuit 21, shown in FIG. 5. In FIGS. 1 and 2 circuit board 20 has been removed for clarity purposes. A pair of batteries 23, of 9 volts each, may be disposed also onto surface 2 of the box. Two side posts 24 are located at both sides of trap opening 5 define a limit for the opening of plates 8.

Driving mechanism 9 and plates 8 are covered by a cap 10 shown in FIGS. 1 and 2 in a detached position and illustrated in FIGS. 3 and 4 when fixed onto box 1. Under cap 10 a bait is retained at the end of an entrance or access 26 by means of a removable grid 31. Bait 25 and access 26 are covered by a roof 27 removably located in a cut 28 of cap 10, at approximately 12 mm. over plates 8. Roof 27 is very important particularly for trapping a very little cockroach. It has been demonstrated that the *Blatella germanica*, which size is up to 15 mm., is capable of suddenly reacting upon the opening of plates 8 and jumping out of access 26. With roof 27 this is prevented as the cockroach hits against roof. Additionally, control circuit 21 delays the closing of plates 8 during approximately 0.0016 sec. so as to cause the cockroach to fall down into cavity 3 after the impact against roof 27. Access 26 is communicated with a sloped surface or ramp 29.

Control circuit 21 comprises an amplifier with transistors T1, T2 and T3 and has and input connected to the electrical conducting portions 30 of plates 8 while the output of the amplifier is connected to solenoid or electromagnet 11. The connection between circuit 21 and portions 30 is performed through ears 18, spring 17 and pins 19 which are connected to the circuit board 20 and hence to circuit 21. If an infrared sensor is provided, circuit 21 will be actuated upon a signal received from this sensor. Since this kind of sensor may be conventional no additional description or illustration is necessary.

During operation, a cockroach enters into access 26 attracted by bait 25 but without entering into contact with the bait because of grid 31. Plates 8 remain closed as far as the cockroach does not touch portions 30, when the legs or any other part of the cockroach body touches simultaneously both portions 30, circuit 21 is closed through spring 17 and pins 19, whereby solenoid 11 is activated and plates 8 suddenly open. Trap opening 5 is thus uncovered and the cockroach falls down into cavity 3. Upon the falling down of the cockroach, the electrical connection between portions 30 is interrupted and plates 8 immediately close again because the circuit is opened. The insect remains thus trapped.

In the event that a cockroach touch portions 30 and, upon the movement of plates 8, immediately lift the legs to run away interrupting the electrical circuit, circuit 21 includes a delay arrangement 32 comprising an RC circuit including resistor R1 and capacitor C1, for keeping the driving means excited to completely open the plates in spite of the very short lapse of time the electrical conducting portions remain electrically connected through the cockroach body. If arrangement 32 would not be provided and the time the legs of a cockroach in contact with portions 30 is not enough, plates 8 may open a bit and close immediately with the result that the cockroach may not fall into cavity 3 and run away.

Although in the event that the time of contact is very short, collector terminal of transistor T3 takes a voltage of almost zero volt to activate electromagnet 11. This voltage is used to keep T2 activated through R1 and C1 until C1 is charged. The delay time is 0.016 to 0.018 seconds and the values of R1 is 3K3 omhs and C5 is 4.7 mf. Diode D protects T2 of an reverse current when the charge of C1 passes through R1 when the amplifier is in a rest mode or deactivated.

In an another event in that a drop of water or any other kind of dirty portions 30 come into permanent electrical contact, the circuit would be continuously activated and plates 8 would be opening and closing repeatedly until batteries 23 are discharged, however circuit 21 includes an interrupting arrangement comprising an RC circuit including resistor R2 and capacitor C2, for interrupting the operation of the driving means upon a circumstance in that a continuous contat is established between the electrical conducting portions of the plates due to the dirt, water and the like. Thus, plates 8 will open and close only during 4 seconds that is the time C2, of 22 mf., will take to be charged. The amplifier cosumption is 0 ma. when is in the rest mode and 220 ma. when is activated and is operated when 18 volts from the two alkaline batteries 23. The device is thus able to operate during more than 7,000 opening-closing actions.

While a preferred embodiment of the present invention has been illustrated and described, it will be obvious to those skilled in the art that various changes and modifications may be made therein without departing from the scope of the invention as defined in the appended claims.

I claim:

1. An automatic trap for catching cockroaches comprising a box defining a cockroach collecting cavity and an upper surface with a trap opening, at least two separate coplanar plates being provided to close said trap opening in a closed position, each plate being pivotally mounted at one end thereof, each plate having an electrical conducting portion connected to a control circuit which, in turn, is connected to a driving mechanism capable of being actuated to pivotally coplanarly move the plates away from each other into an open position for uncovering the trap opening and providing access to the cockroach collecting cavity, a cap being provided on the upper surface of the box for covering the plates and the driving mechanism, the cap defining an access over the plates, the access having a roof and a bait being located under the roof for attracting a cockroach, whereby when a cockroach simultaneously touches the electrical conducting portions of the plates, said portions are put into electrical contact to each other because of the conductivity provided by the cockroach body, so that the driving mechanism is excited by the control circuit to move the plates to their open position.

2. The automatic trap of claim 1, wherein the plates have respective rear ends, each end defining a projecting tip, and the driving mechanism comprises a solenoid having an axially movable magnetic core-stem capable of extending to abut against said tips and urge the plates into the open position.

3. The automatic trap of claim 2, wherein the plates are urged into the close position by respective springs, the springs being electrically connected, at respective ends thereof, to the electrical conducting portions and, at other respective ends thereof, to pending pins electrically connected to the control circuit.

4. The automatic trap of claim 2, wherein the electrical conducting portion of each plate comprises a metal lining on a rear portion of the plate.

5. The automatic trap of claim 2, wherein the bait is located at an end of the access with a grid for preventing a cockroach from entering into contact with the bait.

6. The automatic trap of claim 5, wherein the box has a front sloped surface outside said access.

7. The automatic trap of claim 1, wherein two side posts are provided on the upper surface of the box to limit the opening of the plates.

8. The automatic trap of claim 1, wherein the collected cavity has a floor with a plurality of orifices whereby a gas can enter the cavity from an outer source.

9. The automatic trap of claim 1, wherein the box includes a transparent window.

10. The automatic trap of claim 1, wherein the control circuit is comprised in a circuit board mounted over said driving mechanism and under a cap provided onto the upper surface of the box for covering the plates and the driving mechanism.

11. The automatic trap of claim 1, wherein the control circuit comprises an amplifier having an input connected to the plates and an output connected to the driving means.

12. The automatic trap of claim 11, wherein the amplifier includes a delay arrangement comprising an RC circuit, for keeping the driving means excited to completely open the plates in spite of a circumstance in that the time the electrical conducting portions remain electrically connected through the cockroach body is very much short as to generate a complete opening of the plates.

13. The automatic trap of claim 11 wherein the amplifier includes an interrupting arrangement comprising an RC circuit, for interrupting the operation of the driving means upon a circumstance in that a continuous contact is established between the electrical conducting portions of the plates.

14. The automatic trap of claim 1, wherein the box includes a cockroach removing opening closed by a transparent door.

15. An automatic trap for catching cockroaches comprising a box defining a cockroach collecting cavity and an upper surface with a trap opening, at least two separate coplanar plates being provided to close said trap opening in a closed position, each plate being pivotally mounted at one end thereof, the plates being connected to a control circuit which, in turn, is connected to a driving mechanism, a cockroach sensor being connected to the control circuit and the control being capable of exciting the driving mechanism upon a signal from the sensor, whereby when a cockroach is detected by the sensor the driving mechanism is excited by the control circuit to pivotally coplanarly move the plates away from each other into an open position for uncovering the trap opening and providing access to the cockroach collecting cavity, a cap being provided on the upper surface of the box for covering the plates and the driving mechanism, the cap defining an access over the plates, the access having a roof and a bait being located under the roof for attracting the cockroach.

* * * * *